US012119561B2

(12) United States Patent
Wang et al.

(10) Patent No.: US 12,119,561 B2
(45) Date of Patent: Oct. 15, 2024

(54) DUAL PORT ANTENNA STRUCTURE

(71) Applicant: HUAWEI TECHNOLOGIES CO., LTD., Shenzhen (CN)

(72) Inventors: Hanyang Wang, Reading (GB); Hai Zhou, Reading (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 17/433,951

(22) PCT Filed: Feb. 25, 2019

(86) PCT No.: PCT/EP2019/054579
§ 371 (c)(1),
(2) Date: Aug. 25, 2021

(87) PCT Pub. No.: WO2020/173540
PCT Pub. Date: Sep. 3, 2020

(65) Prior Publication Data

US 2022/0149525 A1 May 12, 2022

(51) Int. Cl.
*H01Q 1/24* (2006.01)
*H01Q 5/328* (2015.01)
(Continued)

(52) U.S. Cl.
CPC ............... *H01Q 5/35* (2015.01); *H01Q 1/243* (2013.01); *H01Q 5/328* (2015.01); *H01Q 5/335* (2015.01)

(58) Field of Classification Search
CPC .......... H01Q 5/35; H01Q 5/328; H01Q 5/335; H01Q 1/243; H01Q 1/328
See application file for complete search history.

(56) References Cited

U.S. PATENT DOCUMENTS 7,724,201 B2 * 5/2010 Nysen ...................... H01Q 9/30 343/820
2009/0109104 A1 4/2009 Ide et al.
2010/0277383 A1 11/2010 Autti et al.
(Continued)

FOREIGN PATENT DOCUMENTS

CN 1666382 A 9/2005
CN 102356514 A 2/2012
(Continued)

OTHER PUBLICATIONS

Sarrazin et al., "Radiation Efficiency Improvement of a Balanced Miniature IFA-Inspired Circular Antenna," HAL open science, IEEE Antennas and Wireless Propagation Letters, Total 5 pages (May 9, 2017).
Xu Haipeng, "Research on Plane Microstrip Antenna Technology," Total 2 pages (2011). With English Abstract.

*Primary Examiner* — Awat M Salih
(74) *Attorney, Agent, or Firm* — Leydig, Voit & Mayer, Ltd.

(57) ABSTRACT

An antenna structure comprising: a first port; a second port; and a single radiator connected to both the first and second ports, the single radiator being operable to simultaneously transceive in: a symmetrical excited mode in which current flows symmetrically through the single radiator to or from the first port, thereby causing the single radiator to resonate at a first resonant frequency; and an asymmetrical excited mode in which current flows asymmetrically through the single radiator to or from the second port, thereby causing the single radiator to resonate at a second resonant frequency. The single radiator comprises: a first element, a second element, and arm connectors connecting the first element to the second element. The first element being elongate and linear. The second element being elongate, linear, and parallel to the first element.

20 Claims, 13 Drawing Sheets

(51) Int. Cl.
*H01Q 5/335* (2015.01)
*H01Q 5/35* (2015.01)

(56) References Cited

U.S. PATENT DOCUMENTS

| | | | | |
|---|---|---|---|---|
| 2010/0279734 | A1 | 11/2010 | Karkinen et al. | |
| 2012/0127051 | A1 | 5/2012 | Chiu et al. | |
| 2012/0262342 | A1 | 10/2012 | Lee | |
| 2014/0132469 | A1 | 5/2014 | Wang et al. | |
| 2015/0109167 | A1 | 4/2015 | Yarga et al. | |
| 2017/0033461 | A1 | 2/2017 | Mohajer Jasebi et al. | |
| 2017/0048649 | A1 | 2/2017 | Olgun et al. | |
| 2017/0093049 | A1 | 3/2017 | Lahti et al. | |
| 2017/0256854 | A1* | 9/2017 | Hu | H01Q 9/40 |

FOREIGN PATENT DOCUMENTS

| | | | |
|---|---|---|---|
| CN | 103339855 | A | 10/2013 |
| CN | 103474750 | A | 12/2013 |
| CN | 103811851 | A | 5/2014 |
| CN | 103843196 | A | 6/2014 |
| CN | 106252876 | A | 12/2016 |
| CN | 106469848 | A | 3/2017 |
| CN | 206293612 | U | 6/2017 |
| CN | 107134645 | A | 9/2017 |
| CN | 107546488 | A | 1/2018 |
| CN | 108701893 | A | 10/2018 |
| EP | 2963736 | A1 | 1/2016 |
| KR | 20100098197 | A | 9/2010 |

* cited by examiner

DUAL PORT ANTENNA STRUCTURE

CROSS-REFERENCE TO RELATED APPLICATIONS

This application is a National Stage of International Patent Application No. PCT/EP2019/054579, filed on Feb. 25, 2019, which is hereby incorporated by reference in its entirety.

FIELD OF THE INVENTION

Embodiments of this application relate to antenna structures, and in particular to providing a compact design for an antenna structure capable of operating in more than one mode.

BACKGROUND

An antenna is a transducer that converts radio frequency electric current to electromagnetic waves that are radiated into space in order to transmit a signal, and that also converts electromagnetic waves from space into radio frequency electric current in order to receive a signal.

Portable handheld units, such as mobile phones and tablets, are typically required to transmit and receive signals at different frequencies. For example, a mobile phone may be required to transceive cellular signals at 1.8 GHz, and Bluetooth signals at 2.45 GHz.

It is known to provide antenna structures in which two separate radiators are collocated: one for transceiving at a first frequency, and the other for transceiving at a second frequency. FIGS. 1*a*, 1*b* and 1*c* illustrate how a first radiator configured to resonate at a first frequency (shown individually in FIG. 1*a*) and a second radiator configured to resonate at a second frequency (shown individually in FIG. 1*b*) can be integrated to form a combined antenna structure (shown in FIG. 1*c*). The first radiator is a dipole antenna having two metal strips 101*a* and 101*b* which are fed in a differential mode with a first current from port 102, generating radiation pattern 103. The second radiator is a dipole antenna having two metal strips 104*a* and 104*b* which are fed in a common mode with a second current from port 105, generating radiation pattern 106. In the combined antenna structure shown in FIG. 1*c*, the radiation patterns generated by the individual radiators of FIGS. 1*a* and 1*b* have little overlap and hence are well isolated from each other, thereby enabling signals of both the first and second frequencies to be transceived at the same time.

Many products into which antennas are integrated, for example mobile phones and tablets, have many internal components, all of which need to fit within a limited overall volume. It is therefore desirable to minimize the volume dedicated to each internal component, without losing performance of that component. The antenna structure of FIG. 1*c* uses two radiators, each of which generates a single resonance. It is desirable to provide an antenna structure having at least two resonances which is more compact than the structure of FIG. 1*c* whilst maintaining sufficient isolation so as to enable signals at both resonant frequencies to be transceived at the same time.

SUMMARY OF THE INVENTION

According to a first aspect, there is provided an antenna structure comprising: a first port; a second port; and a single radiator connected to both the first and second ports, the single radiator being operable to simultaneously transceive in: a symmetrical excited mode in which current flows symmetrically through the single radiator to or from the first port, thereby causing the single radiator to resonate at a first resonant frequency; and an asymmetrical excited mode in which current flows asymmetrically through the single radiator to or from the second port, thereby causing the single radiator to resonate at a second resonant frequency. This is a compact antenna structure which is able to transceive on two frequencies at the same time whilst exhibiting high isolation.

The second resonant frequency may be the same as (or very close to) the first resonant frequency.

The single radiator may be operable to transceive in a further symmetrical excited mode in which current flows symmetrically through the single radiator to or from the first port, thereby causing the single radiator to resonate at a third resonant frequency. This enables the antenna structure to additionally transceive on a further frequency.

The single radiator may be operable to simultaneously transceive in both the symmetrical excited mode and the further symmetrical excited mode. Thus, the antenna structure is able to transceive on the first, second and third frequencies at the same time.

The single radiator may be operable to transceive in a further asymmetrical excited mode in which current flows asymmetrically through the single radiator to or from the second port, thereby causing the single radiator to resonate at a fourth resonant frequency. This enables the antenna structure to additionally transceive on a yet further frequency.

The single radiator may be operable to simultaneously transceive in both the asymmetrical excited mode and the further asymmetrical excited mode. Thus, the antenna structure is able to transceive on the first, second, fourth and optionally third frequencies at the same time.

The single radiator may comprise: a first element, the first element being elongate and linear; a second element, the second element being elongate, linear, and parallel to the first element; and arm connectors connecting the first element to the second element. This is a compact layout.

The first element, second elements and arm connectors may form a symmetrical structure. The symmetry in the layout of the antenna structure aids in generating generally uniform radiation patterns at the resonant frequencies.

The first port may comprise a set of first port feedlines connected to the first element in a symmetrical arrangement. The symmetry in the layout of the first port aids in generating generally uniform radiation patterns in the symmetrical excited mode(s).

The antenna structure may be configured to feed a signal being transmitted or received via the first port along a central first port feedline of the set of first port feedlines. This causes a more symmetrical current flow through the radiator, and hence a more uniform radiation pattern in the symmetrical excited mode(s).

The second port may comprise two second port feedlines connected to the second element in a symmetrical arrangement. The symmetry in the layout of the second port aids in generating generally uniform radiation patterns in the asymmetrical excited mode(s).

The antenna structure may be configured to feed a signal being transmitted or received via the second port as a differential signal along the two second port feedlines. Feeding the second port with a differential signal generates the asymmetrical current flow in the asymmetrical mode.

The antenna structure may be configured to feed a signal being transmitted or received via the second port through a co-axial cable coupled to a balun or a microstrip coupled to a balun. Both of these feeding structures generate the asymmetrical current flow in the asymmetrical mode.

Each first port feedline and/or each second port feedline may comprise impedance matching network circuitry. This ensures efficient power transfer from the feedlines to the radiator, and prevents standing waves from establishing.

The antenna structure may have a three-dimensional profile and/or be comprised partially or wholly of multiple layers. This may enable the antenna structure to fit into the shape of the available volume in, for example, the mobile phone or tablet into which the antenna structure is incorporated.

According to a second aspect, there is provided a method of operating an antenna structure comprising a first port, a second port, and a single radiator connected to both the first and second ports, the method comprising: simultaneously transceiving in: a symmetrical excited mode in which current flows symmetrically through the single radiator to or from the first port, thereby causing the single radiator to resonate at a first resonant frequency; and an asymmetrical excited mode in which current flows asymmetrically through the single radiator to or from the second port, thereby causing the single radiator to resonate at a second resonant frequency. This method enables a compact antenna structure to transceive on two frequencies at the same time whilst exhibiting high isolation.

BRIEF DESCRIPTION OF THE FIGURES

The present application will now be described by way of example with reference to the accompanying drawings. In the drawings.

DETAILED DESCRIPTION

Figure 1A:
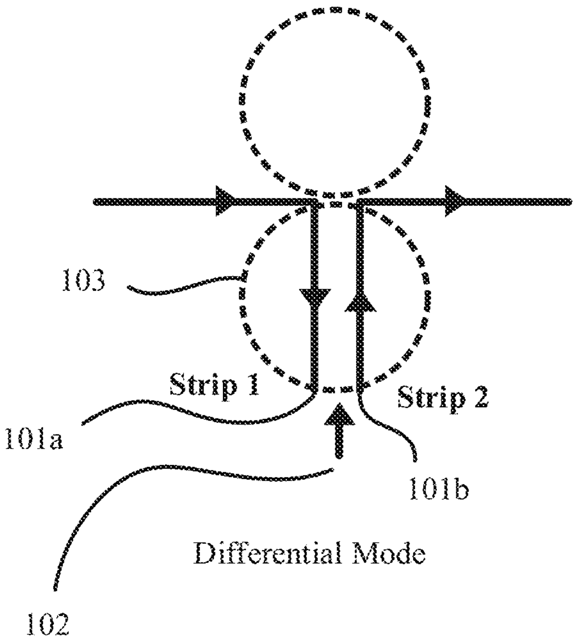
FIGS. 1*a*, 1*b* and 1*c* illustrate a known antenna structure having two collocated radiators.
Figure 1B:
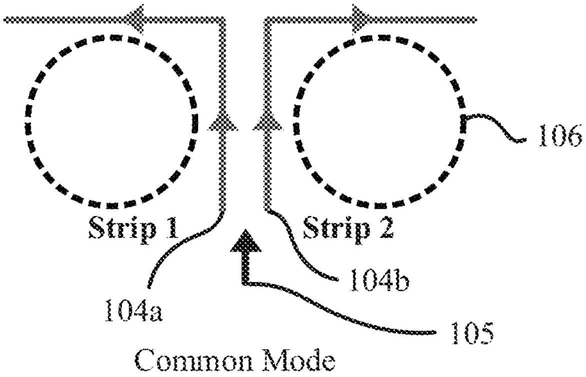
Figure 1C:
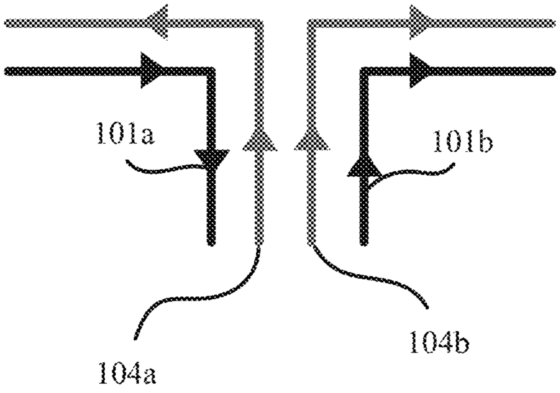
Figure 2:
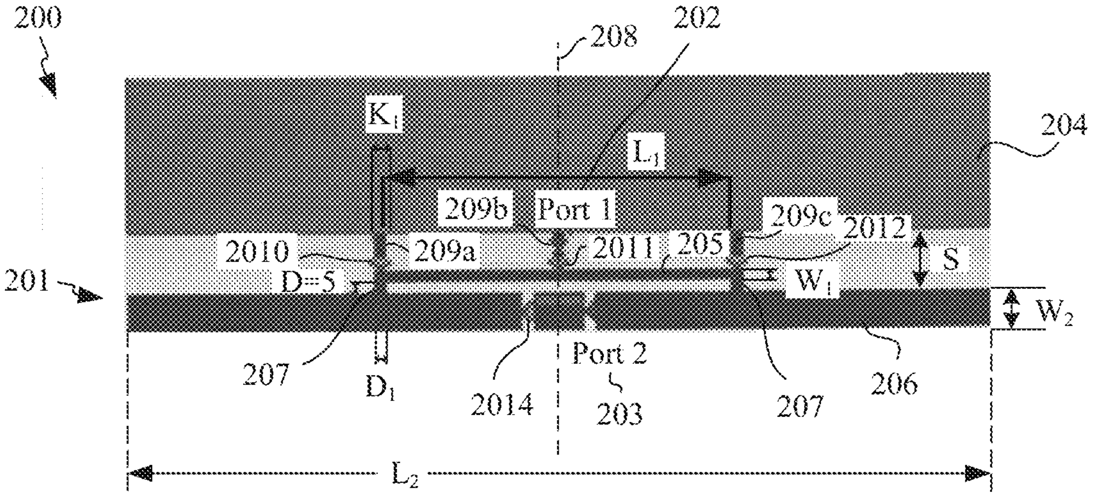
FIG. 2 illustrates an exemplary antenna structure according to the present application.

FIG. 2 illustrates an example antenna structure of the embodiments of the present application, shown generally at 200. The antenna structure comprises a single radiator 201 connected to two ports: first port 202 and second port 203. In this example, the antenna structure 200 is connected to ground plane 204 via the first port 202. The single radiator 201 comprises a first element 205 and a second element 206, which are connected by arm connectors 207. Each of the first and second elements is elongate and linear. The first element is parallel to the second element.

In the example of FIG. 2, the first element 205 is shorter than the second element 206 in the direction in which they are parallel. For example, the longitudinal length $L_1$ of the first element 205 may be in the range 10-20 mm. The longitudinal length $L_2$ of the second element 206 may be in the range 70-76 mm. In the example of FIG. 2, the first element 205 is narrower than the second element 206 in the direction perpendicular to that in which they are parallel. For example, the width $W_1$ of the first element 205 may be less than or the same as 1 mm. The width $W_2$ of the second element 206 may be in the range 2-3 mm.

In the example of FIG. 2, there are two arm connectors 207, each of which connects a different end of the first element 205 to the second element 206. However, there may be more than two arm connectors 207. For example, there may be further arm connectors in between the two arm connectors illustrated on FIG. 2. In the example of FIG. 2, the arm connectors extend perpendicularly from the first element to the second element. Alternatively, the arm connectors may extend at a (non-perpendicular) angle from the first element to the second element. The arm connectors may have similar proportions to the width $W_1$ of the first element. For example, the arm connectors may each have a length $D_1$ in the direction of elongation of the first and second elements of less than or the same as 1 mm. Similarly, the arm connectors may each have a length $D_2$ perpendicular to the direction of elongation of the first and second elements of less than or the same as 1 mm.

In the example of FIG. 2, the second element 206 is separated from the ground plane 204 in a direction perpendicular to the direction of elongation of the second element 206 by a gap S. S may be, for example, in the range 2-3 mm.

The values of $L_1$, $L_2$, $W_1$, $W_2$, $D_1$, $D_2$ and S identified above are all suitable for an implementation in which the antenna structure is incorporated into a mobile phone.

In the example of FIG. 2, the first element 205, the second element 206 and the arm connectors 207 form a symmetrical structure. This structure has reflectional symmetry about an axis 208 which bisects the structure in a direction perpendicular to the direction of elongation of the first and second elements. The midpoint of the longitudinal length of the first element 205 lies on the axis 208. The midpoint of the longitudinal length of the second element 206 lies on the axis 208. The symmetry of the first element, second element and arm connectors aids in generating a generally uniform radiation pattern at resonance when current is fed into the structure.

Figure 3A:
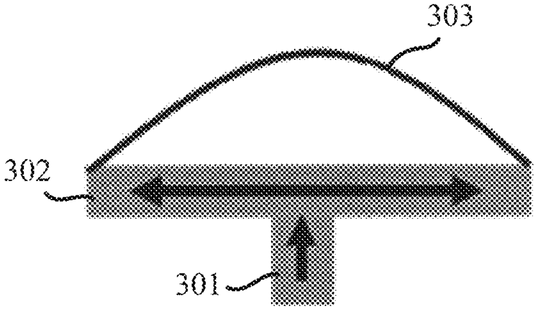
FIGS. 3*a* and 3*b* illustrate symmetrical and asymmetrical modes of a radiator.
Figure 3B:
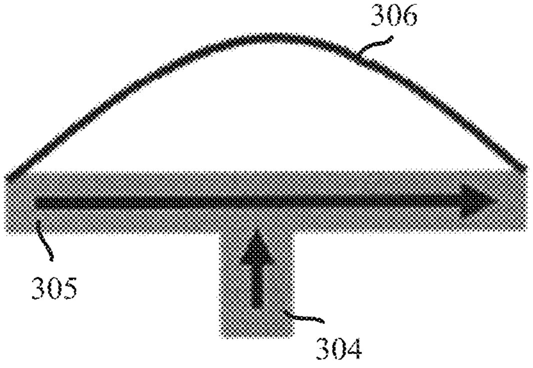

Current fed through the first port 202 causes the single radiator 201 to resonate to transceive a signal. Current fed through the second port 203 also causes the single radiator 201 to resonate to transceive a signal. Thus, the same single radiator is used to generate resonances by both the first and second ports. The first port 202 operates in a symmetrical mode, in which current flows symmetrically through the single radiator to or from the first port. FIG. 3*a* illustrates such a symmetrical mode. Current fed through feedline 301 causes current to flow equally in both directions through the linear radiator 302. Curve 303 demonstrates the relative amplitude of the current through the radiator 302. The current amplitude peaks in the centre where the feedline meets the radiator, and falls evenly to either side from there. The second port 203 operates in an asymmetrical mode, in which current flows asymmetrically through the single radiator to or from the second port. FIG. 3*b* illustrates such an asymmetrical mode. Current fed through feedline 304 causes current to flow in a single direction through the radiator 305. Curve 306 demonstrates the relative amplitude of the current through the radiator 305. The current amplitude peaks in the centre where the feedline meets the radiator, and falls evenly to either side from there.

The following describes exemplary arrangements of the first port 202 and second port 203 which cause current to flow through the radiator of FIG. 2 in symmetrical and asymmetrical modes respectively.

The first port 202 of the antenna structure 200 of FIG. 2 comprises a set of first port feedlines 209*a*, 209*b*, 209*c*. These first port feedlines feed current into the single radiator 201 from the first port. The first port feedlines connect to the first element 205. The first port feedlines connect to an opposing side of the first element 205 to the arm connectors 207. In the example of FIG. 2, the first port feedlines connect the ground plane 204 to the first element 205.

In FIG. 2, three first port feedlines are shown. However, there may be more than three first port feedlines. Alternatively, there may be fewer than three first port feedlines. In FIG. 2, the first port feedlines are connected to the first element 205 in a symmetrical arrangement. One first port feedline 209*a* connects to one end of first element 205, and another first port feedline 209*c* connects to the other end of first element 205. A further first port feedline 209*b* connects to the midpoint of first element 205. In FIG. 2, the combination of the first port feedlines 209*a*, 209*b*, 209*c* and the first element 205 form a symmetrical structure which has reflectional symmetry about the axis 208.

In FIG. 2, the first port feedlines extend perpendicularly to the direction of elongation of the first element 205. In FIG. 2, the first port feedlines are in the same plane as the remainder of the antenna structure. In other words, the first port feedlines and the single radiator 201 form a planar structure. Alternatively, the first port feedlines may extend out of the plane of the single radiator. For example, the first port feedlines may extend perpendicularly to the plane of the single radiator 201. This may aid fitting the antenna structure into the shape of the available volume of the device into which the antenna structure is integrated.

The dimensions of the first port feedlines 209 are similar to those of the first element 205 and arm connectors 207. For example, the first port feedlines may each have a length $K_1$ in the direction of elongation of the first and second elements of less than or the same as 1 mm.

Figure 4:
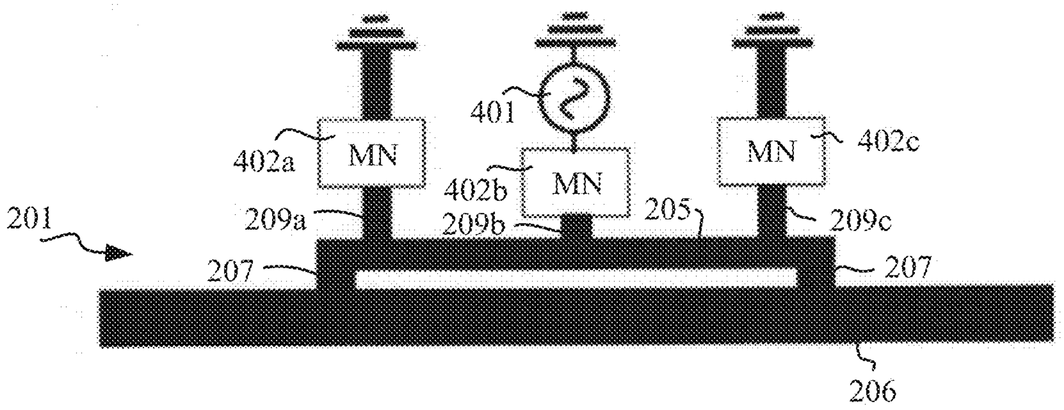
FIG. 4 illustrates an example feeding structure for the first port of the antenna structure.

FIG. 4 illustrates an example feeding structure for the first port 202. In this example, the signal 401 being transmitted or received is fed along a central feedline 209*b* of the set of first port feedlines. This aids in generating a more symmetrical current flow through the radiator, and hence a more uniform radiation pattern.

Figure 5:
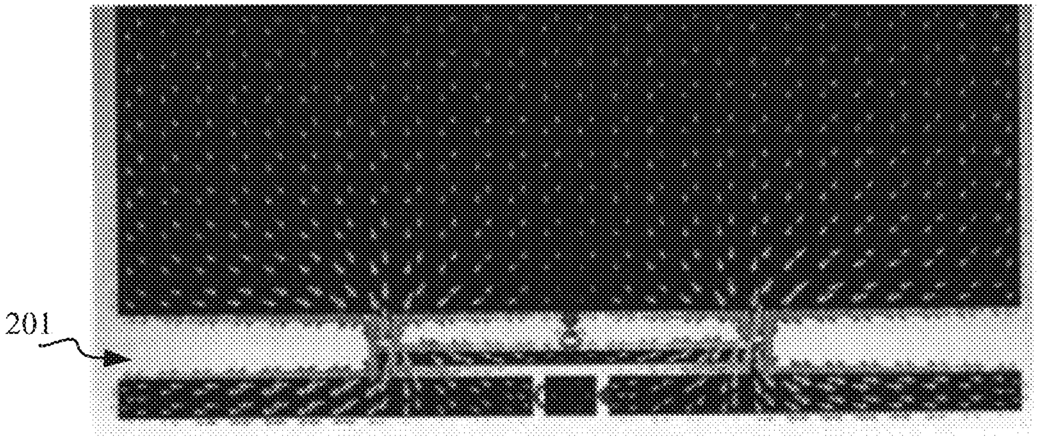
FIG. 5 illustrates a current distribution for a symmetrically excited mode of the antenna structure.
Figure 6:
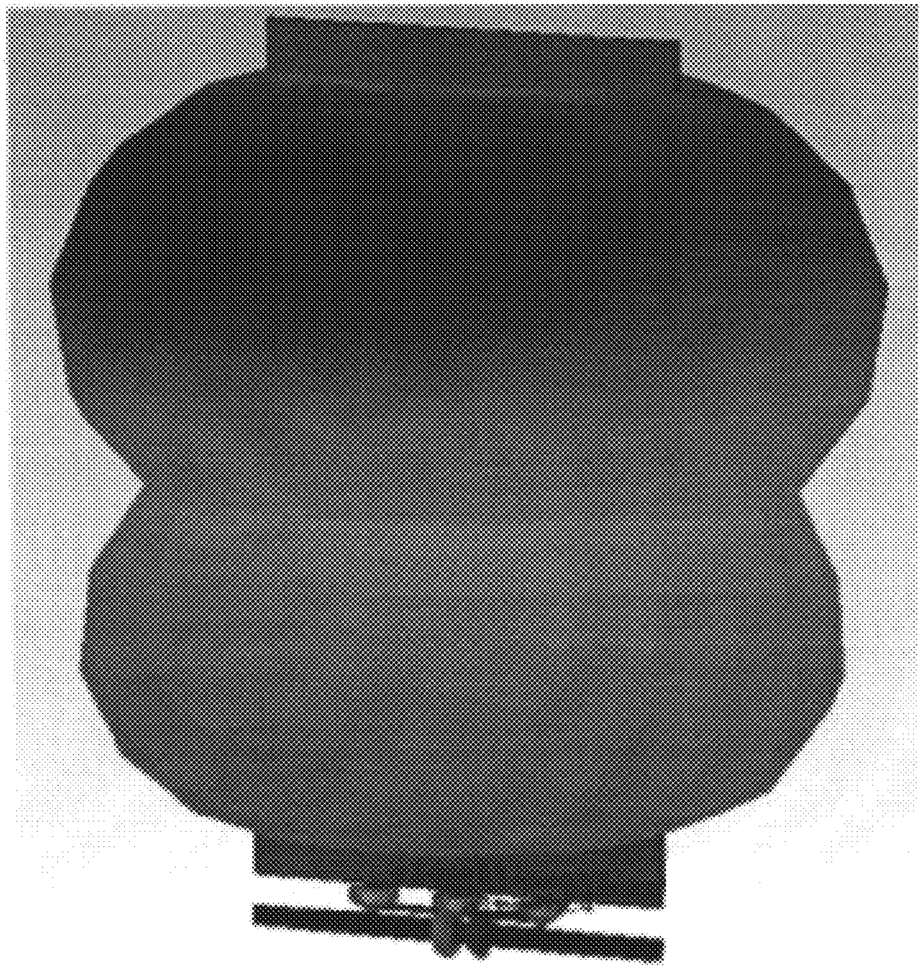
FIG. 6 illustrates the radiation pattern for the resonance shown in FIG. 5.

FIG. 5 illustrates a current distribution for a resonance of the antenna structure of FIG. 2 excited by the first port 202. The resonance shown is at a resonant frequency of 1.8 GHz. This is a symmetrical excited mode in which current flows symmetrically through the radiator 201 from the first port 202. FIG. 6 illustrates the radiation pattern for the resonance at the resonant frequency of 1.8 GHz shown in FIG. 5. The radiation pattern is shown in 3D. The generally uniform shape of the radiation pattern illustrates high isolation between the symmetrical and asymmetrical modes of the antenna structure.

The second port 203 of the antenna structure 200 of FIG. 2 will now be described. The second port 203 comprises a set of second port feedlines. These second port feedlines are not shown on FIG. 2. The second port feedlines connect to the second element 206 of the antenna structure. The second port feedlines connect to an opposing side of the second element 206 to the arm connectors 207.

FIGS. 7 to 10 illustrates example feeding arrangements for the second port. In all of these arrangements, the second port comprises two second port feedlines 701*a* and 701*b*. These two feedlines are connected to the second element 206 in a symmetrical arrangement. The two feedlines are connected to a central area of the second element 206. The combination of the second port feedlines 701*a*, 701*b* and the second element 206 form a symmetrical structure which has reflectional symmetry about the axis 208. In alternative feeding arrangements, there may be more than two second port feedlines.

In the examples of FIGS. 7 to 10, the second port feedlines extend perpendicularly to the direction of elongation of the second element 206. The second port feedlines are in the same plane as the remainder of the antenna structure. In other words, the second port feedlines and the single radiator 201 form a planar structure. Alternatively, the second port feedlines may extend out of the plane of the single radiator. For example, the second port feedlines may extend perpendicularly to the plane of the single radiator 201. This may aid fitting the antenna structure into the shape of the available volume of the device into which the antenna structure is integrated.

The dimensions of the second port feedlines 701*a*, 701*b* are similar to those of the first element 205 and arm connectors 207. For example, the second port feedlines may each have a length $K_2$ in the direction of elongation of the first and second elements of less than or the same as 1 mm.

Figure 7:
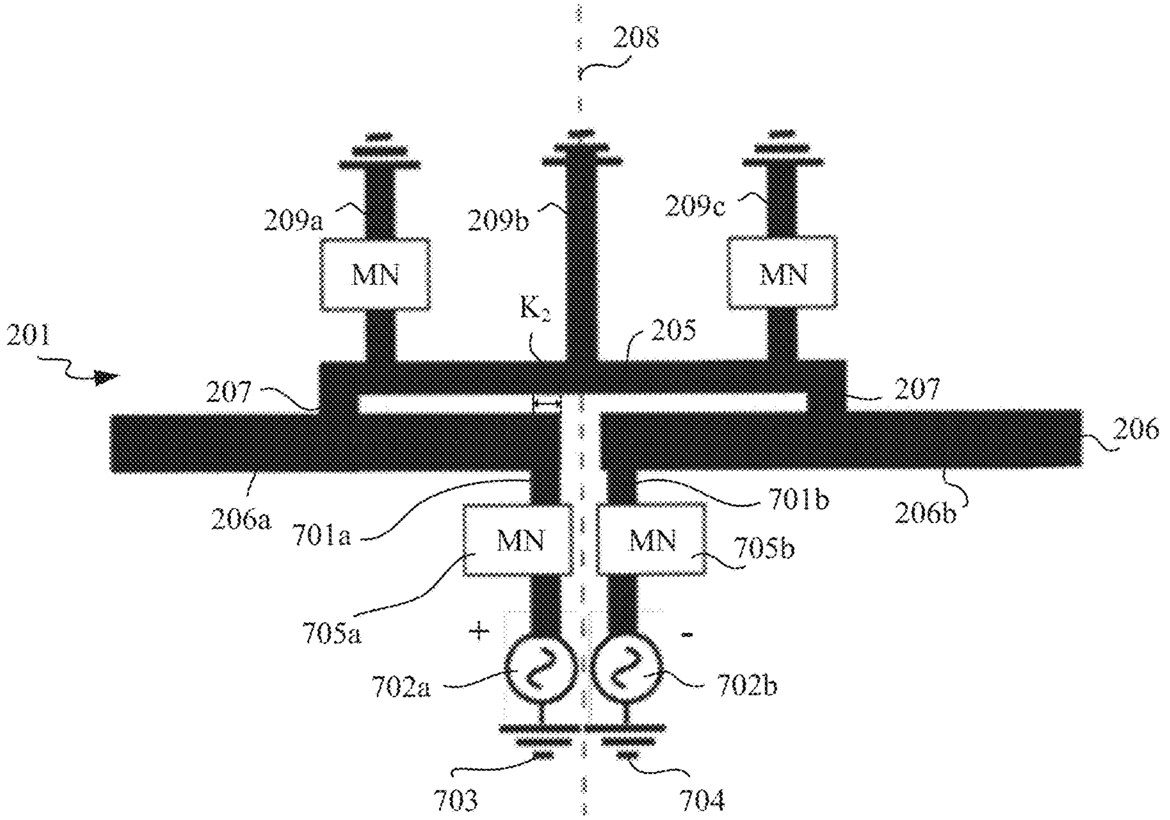
FIGS. 7 to 10 illustrate example feeding structures for the second port of the antenna structure.
Figure 8:
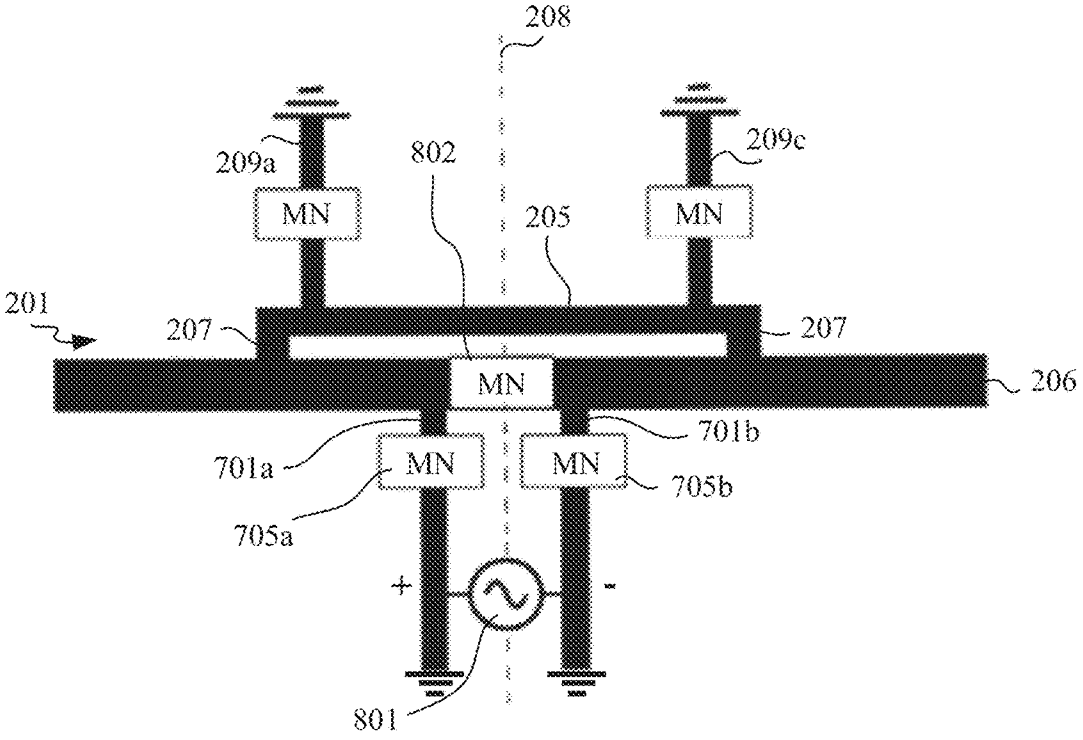

FIGS. 7 and 8 illustrate differential feeding structures for the second port. In FIG. 7, the differential pair of signals 702*a*, 702*b* being transmitted or received are fed along second port feedlines 701*a*, 701*b* to second element 206. In FIG. 7, the second element 206 is disconnected in the centre of the antenna structure. A first one of the second port feedlines 701*a* connects to one end of the disconnected second element 206*a* in a central region of the first radiator 201. The other end of the first one of the second port feedlines 701*a* is connected to ground at 703. The second one of the second port feedlines 701*b* connects to one end of the other disconnected second element 206*b* in the central region of the first radiator 201. The other end of the second one of the second port feedlines 701*b* is connected to ground at 704.

In FIG. 8, the second element 206 is not disconnected in the centre of the antenna structure. The second element 206 is continuous in the central region of the first radiator 201.

Each of the second port feedlines 701*a*, 701*b* connects to the second element 206 in the central region of the first radiator 201. The signal to be transmitted 801 is fed differentially to the two second port feedlines.

Figure 9:
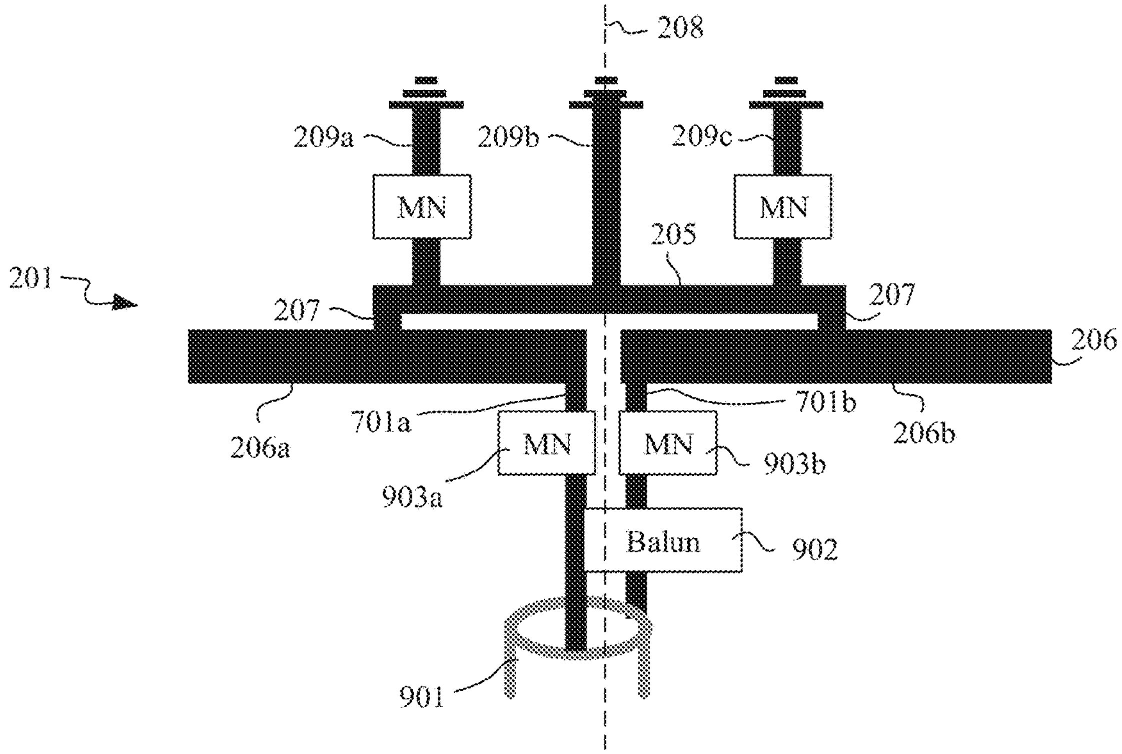

FIG. 9 illustrates a coaxial cable feeding structure for the second port. As in FIG. 7, the second element 206 is disconnected in the centre of the antenna structure. The signal being transmitted or received via the second port is fed through a wire in coaxial cable 901 to a first one of the second port feedlines 701*a*. This first one of the second port feedlines 701*a* connects to one end of the disconnected second element 206*a* in the central region of the first radiator 201. The sheath of the coaxial cable terminates in the ground plane. The second one of the second port feedlines 701*b* connects the sheath of the coaxial cable to one end of the other disconnected second element 206*b* in the central region of the first radiator 201 via balun 902.

Figure 10:
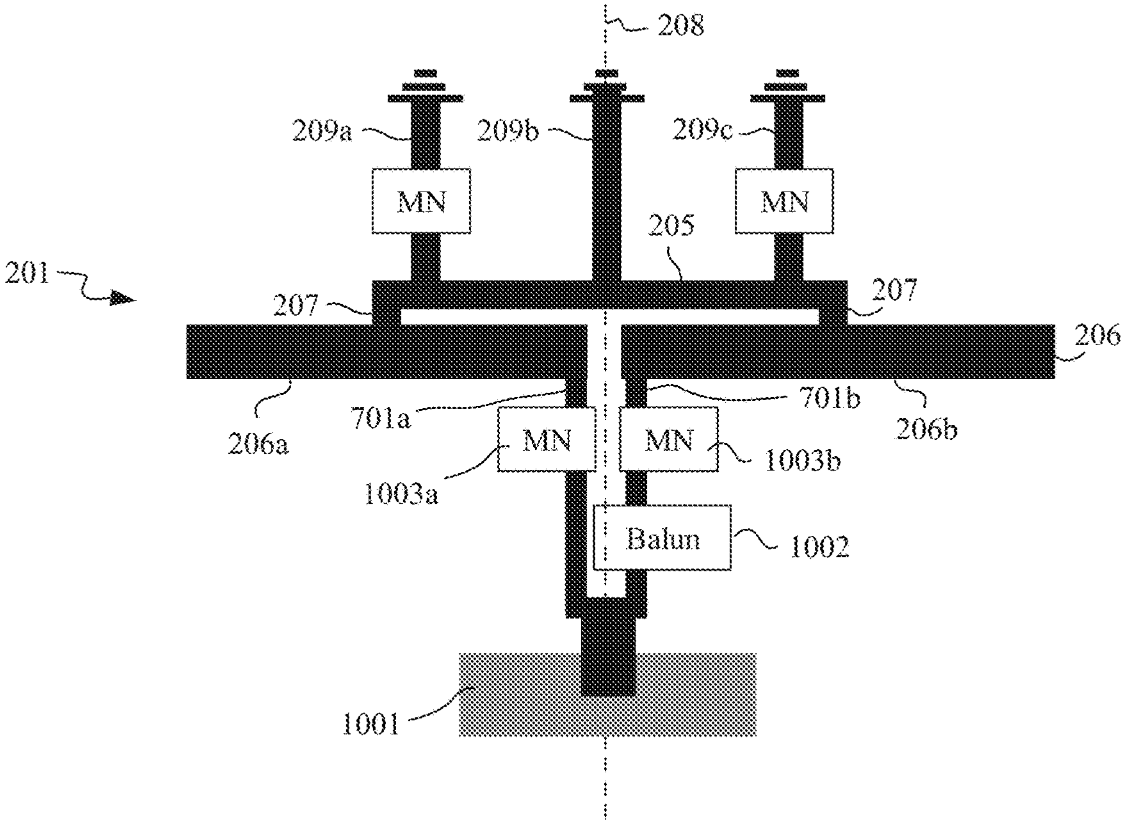

FIG. 10 illustrates a microstrip feeding structure for the second port. The signal being transmitted or received via the second port is fed to or from microstrip 1001. As in FIG. 7, the second element 206 is disconnected in the centre of the antenna structure. The first one of the second port feedlines 701*a* connects one end of the disconnected second element 206*a* in the central region of the first radiator 201 to microstrip 1001. The second one of the second port feedlines 701*b* connects the end of the other disconnected second element 206*b* in the central region of the first radiator 201 to microstrip 1001 via balun 1002.

Figure 11:
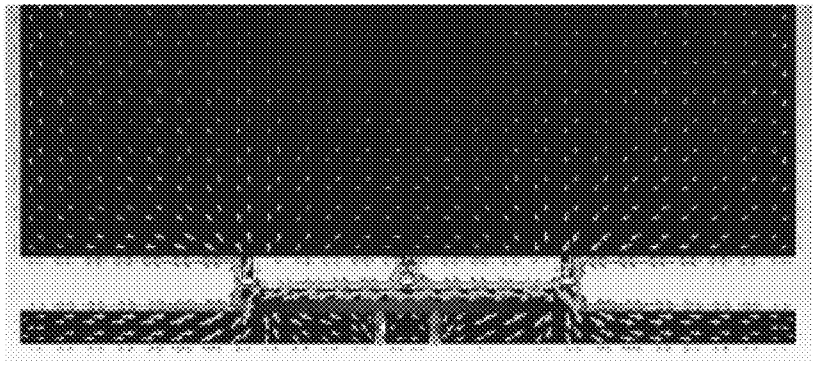
FIG. 11 illustrates a current distribution for an asymmetrically excited mode of the antenna structure.
Figure 12:
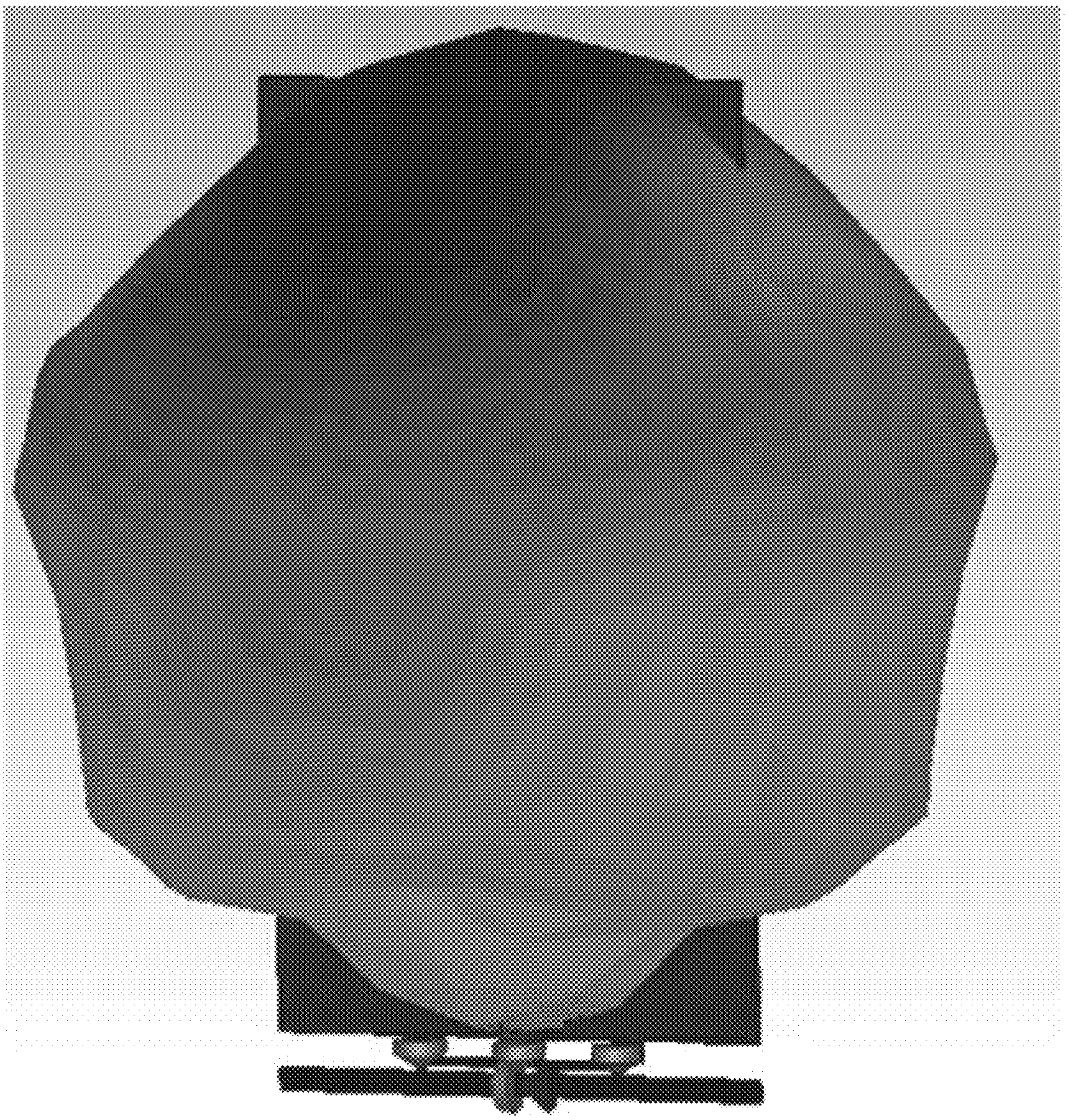
FIG. 12 illustrates the radiation pattern for the resonance shown in FIG. 11.

FIG. 11 illustrates a current distribution for a resonance of the antenna structure of FIG. 2 excited by the second port 203. The resonance shown is at a resonant frequency of 2.08 GHz. This is an asymmetrical excited mode in which current flows asymmetrically through the radiator 201 from the second port 203. FIG. 12 illustrates the radiation pattern for the resonance at the resonant frequency of 2.08 GHz shown in FIG. 11. The radiation pattern is shown in 3D. The generally uniform shape of the radiation pattern illustrates high isolation between the symmetrical and asymmetrical modes of the antenna structure.

In addition to the features described above, the feeding structures for the first and second ports may comprise impedance matching network circuitry. This is shown labelled MN on each of the feedlines in FIGS. 4 and 7 to 10. Each impedance matching network circuitry may comprise one or more of the following: inductor(s), capacitor(s), switch(es), and variable capacitor(s). The impedance matching network circuitry transforms the impedance relationship between the circuitry on either side of the matching network circuitry so that their impedances match. This enables the signal power to be efficiently transferred to the antenna from the transmit circuitry during transmission, and power to be efficiently transferred from the antenna to the receive circuitry during reception.

As an example, in the antenna structure of FIG. 2, the matching network circuitry 2010 may be an inductor, the matching network circuitry 2011 may be a capacitor, the matching network circuitry 2012 may be another inductor, and the matching network circuitry 2014 may be another capacitor.

In the example feeding structure for the first port of the antenna structure shown in FIG. 4, each of the first port feedlines comprises impedance matching network circuitry 402. For the central first port feedline 209*b*, the impedance matching network circuitry 402*b* is located between the signal being applied to the feedline at 401 and the feedline connecting to the first element 205.

In the example feeding structures for the second port of the antenna structure shown in FIGS. 7 and 8, each of the second port feedlines comprises impedance matching network circuitry 705. For both second port feedlines, the impedance matching network circuitry 705*a*, 705*b* is located between the signal being applied to the feedline at 702*a*, 702*b* and the feedline connecting to the second element 206. In FIG. 8, further impedance matching network circuitry 802 is integrated into the second element 206 between the points of the second element 206 which connect to the first and second second port feedlines 701*a*, 701*b*.

In the example feeding structure for the second port of the antenna structure shown in FIG. 9, each of the second port feedlines comprises impedance matching network circuitry 903*a*, 903*b*. For the first second port feedline 701*a*, the impedance matching network circuitry 903*a* is located between the coaxial cable 901 and the connection with the second element 206*a*. For the second second port feedline 701*b*, the impedance matching network circuitry 903*b* is located between the connection with the second element 206*b* and the balun 902.

In the example feeding structure for the second port of the antenna structure shown in FIG. 10, each of the second port feedlines comprises impedance matching network circuitry 1003*a*, 1003*b*. For the first second port feedline 701*a*, the impedance matching network circuitry 1003*a* is located between the microstrip 1001 and the connection with the second element 206*a*. For the second second port feedline 701*b*, the impedance matching network circuitry 1003*b* is located between the connection with the second element 206*b* and the balun 1002.

As described above, the antenna structure of FIG. 2 can operate in both a symmetrical excited mode in which a signal is transmitted from or received by the first port 202, and an asymmetrical excited mode in which a signal is transmitted from or received by the second port 203. The two modes are sufficiently well isolated that the antenna structure can simultaneously transceive in the symmetrical mode and the asymmetrical mode. In other words, the antenna structure can: (i) transmit in both the symmetrical and asymmetrical modes at the same time, or (ii) receive in both the symmetrical and asymmetrical modes at the same time, or (iii) transmit in the symmetrical mode and receive in the asymmetrical mode at the same time, or (iv) receive in the symmetrical mode and transmit in the asymmetrical mode at the same time. The resonant frequency of the symmetrical mode may be the same as the resonant frequency of the asymmetrical mode. The resonant frequency of the symmetrical mode may be different to the resonant frequency of the asymmetrical mode.

Figure 13:
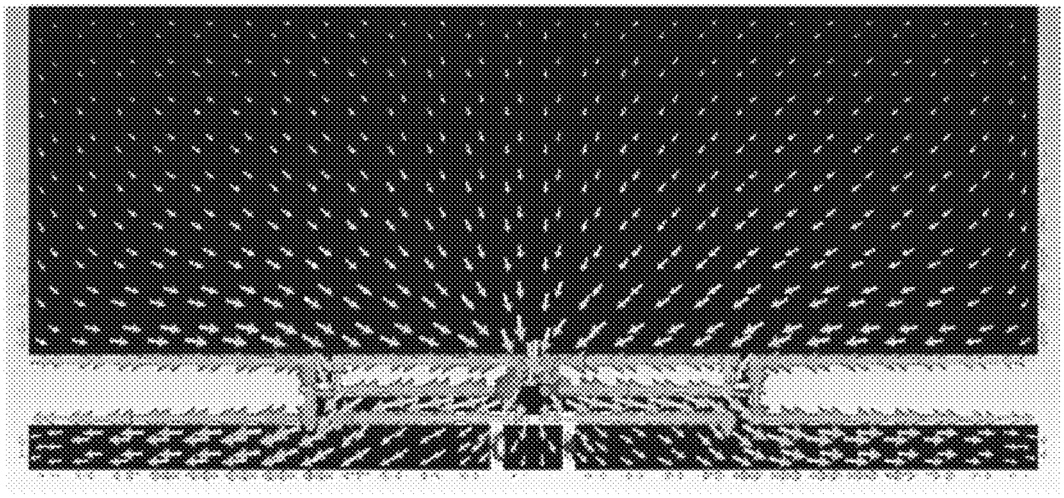
FIG. 13 illustrates a current distribution for a symmetrically excited mode of the antenna structure.
Figure 14:
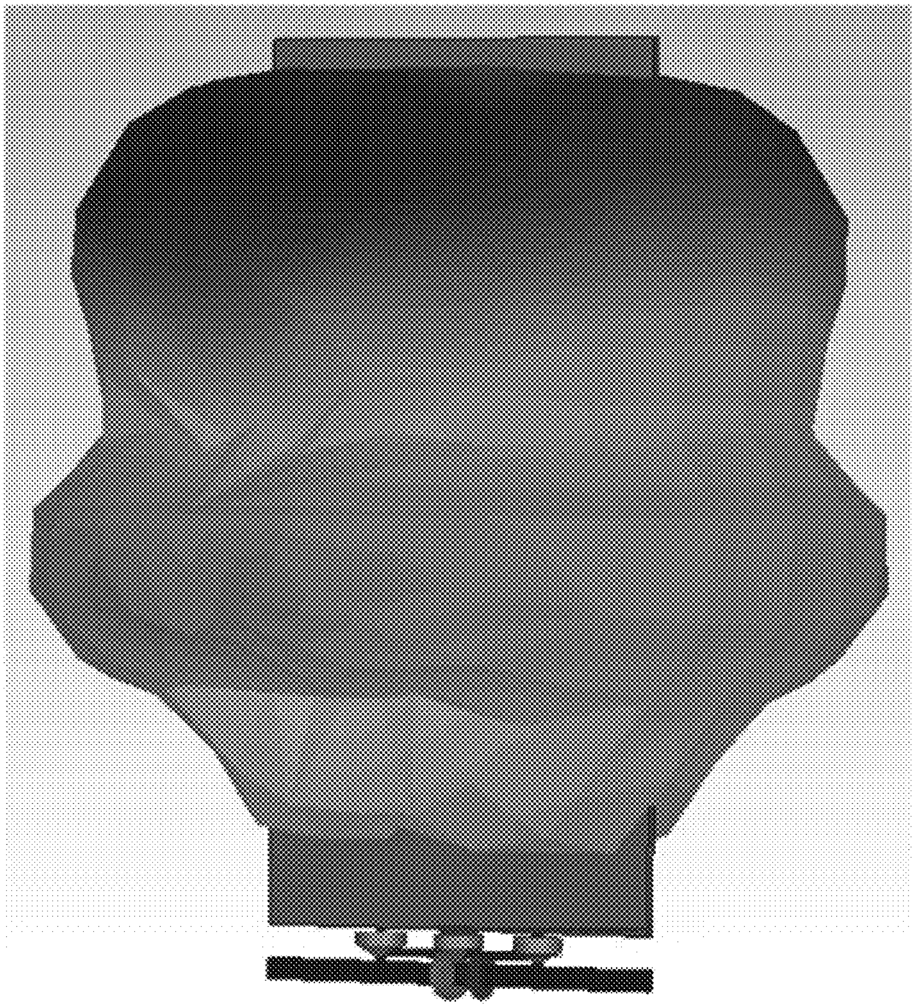
FIG. 14 illustrates the radiation pattern for the resonance shown in FIG. 13.

The antenna structure may additionally be operable to transceive in a further symmetrical mode in which current flows symmetrically through the single radiator 201 to or from the first port 202. This further symmetrical mode causes the single radiator 201 to resonate at a different frequency to the resonant frequency of the first symmetrical mode. FIG. 13 illustrates a current distribution for a resonance of the antenna structure of FIG. 2 excited by the first port 202. The resonance shown is at a resonant frequency of 2.45 GHz. This is a symmetrical excited mode in which current flows symmetrically through the radiator 201 from the first port 202. FIG. 14 illustrates the radiation pattern for the resonance at the resonant frequency of 2.45 GHz shown in FIG. 13. The radiation pattern is shown in 3D. The generally uniform shape of the radiation pattern illustrates high isolation between the symmetrical and asymmetrical modes of the antenna structure.

Figure 15:
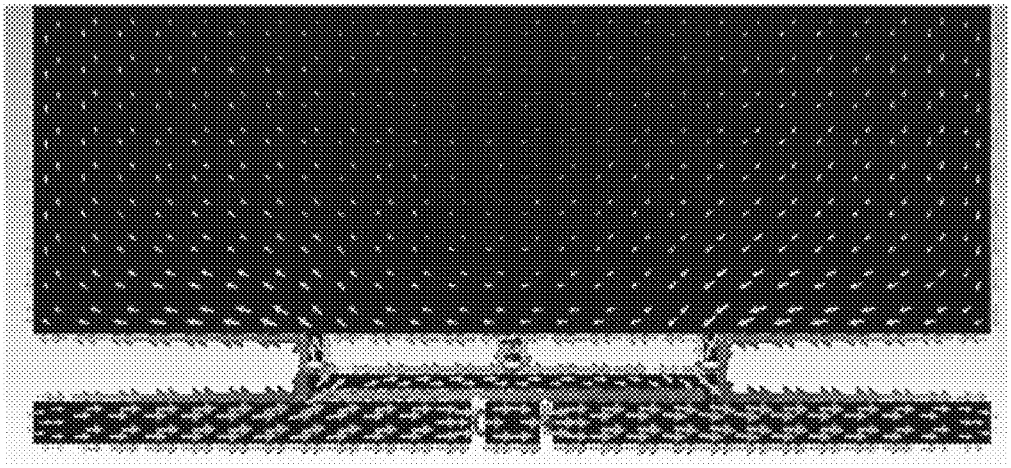
FIG. 15 illustrates a current distribution for an asymmetrically excited mode of the antenna structure.
Figure 16:
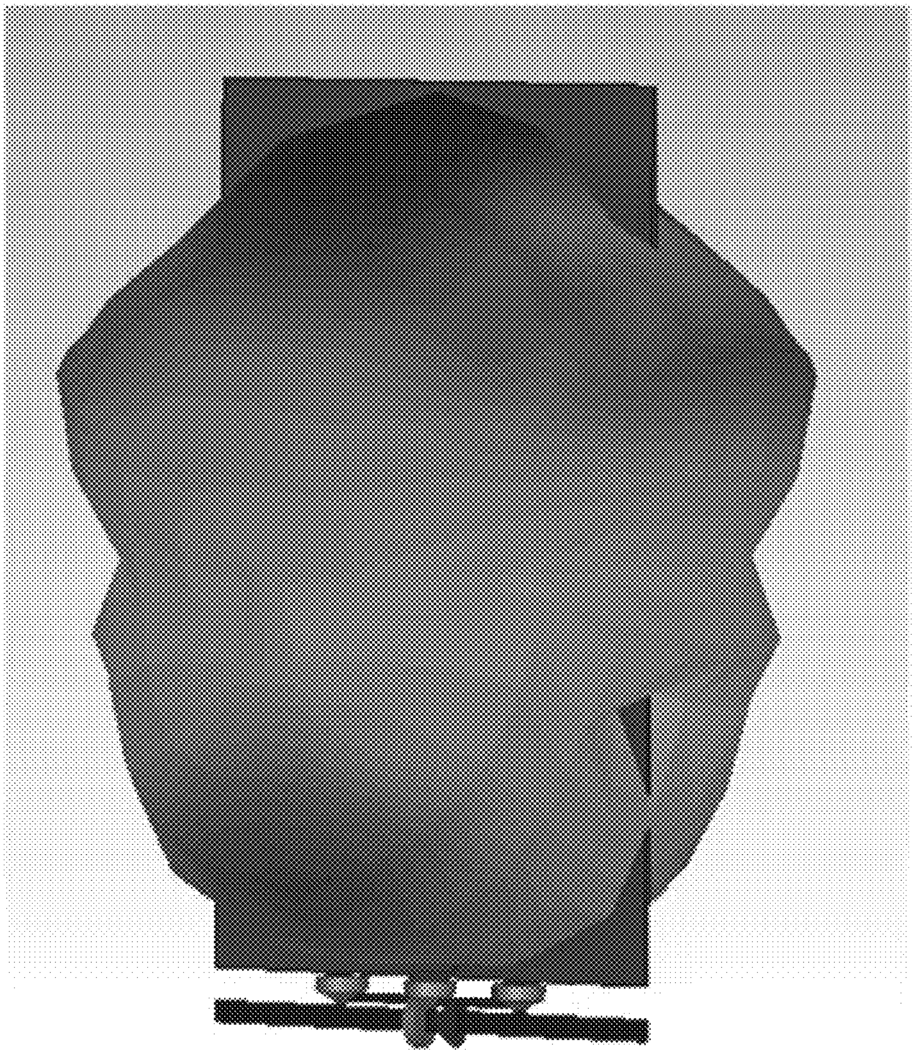
FIG. 16 illustrates the radiation pattern for the resonance shown in FIG. 15.

The antenna structure may additionally be operable to transceive in a further asymmetrical mode in which current flows asymmetrically through the single radiator 201 to or from the second port 203. This further asymmetrical mode causes the single radiator 201 to resonate at a different frequency to the resonant frequency of the first asymmetrical mode. FIG. 15 illustrates a current distribution for a resonance of the antenna structure of FIG. 2 excited by the second port 203. The resonance shown is at a resonant frequency of 2.45 GHz. This is an asymmetrical excited mode in which current flows asymmetrically through the radiator 201 from the second port 203. FIG. 16 illustrates the radiation pattern for the resonance at the resonant frequency of 2.45 GHz shown in FIG. 15. The radiation pattern is shown in 3D. The generally uniform shape of the radiation pattern illustrates high isolation between the symmetrical and asymmetrical modes of the antenna structure.

The antenna structure of FIG. 2 can transceive in any combination of the first and further symmetrical modes and first and further asymmetrical modes described above at the same time. The term transceive is used herein to mean transmit or receive. Thus, the antenna structure can transmit or receive in any one of the four described modes individually whilst also transmitting or receiving in each of the other three modes. As an example, the antenna structure can receive in all four modes at the same time.

Figure 17:
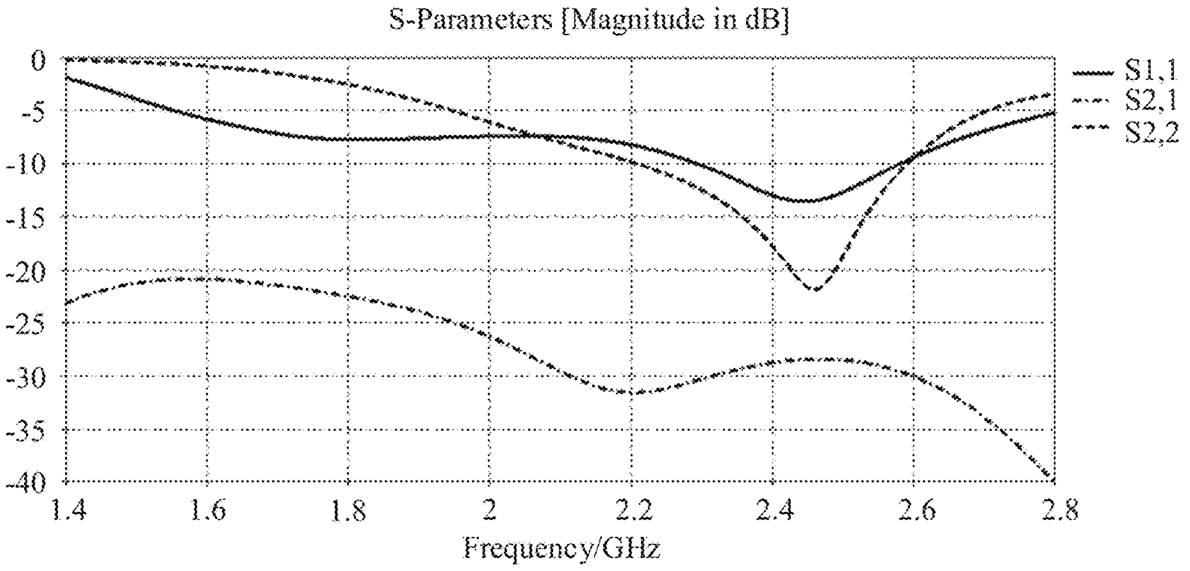
FIGS. 17 and 18 illustrate the S parameter performance of an example embodiment of the antenna structure.
Figure 18:
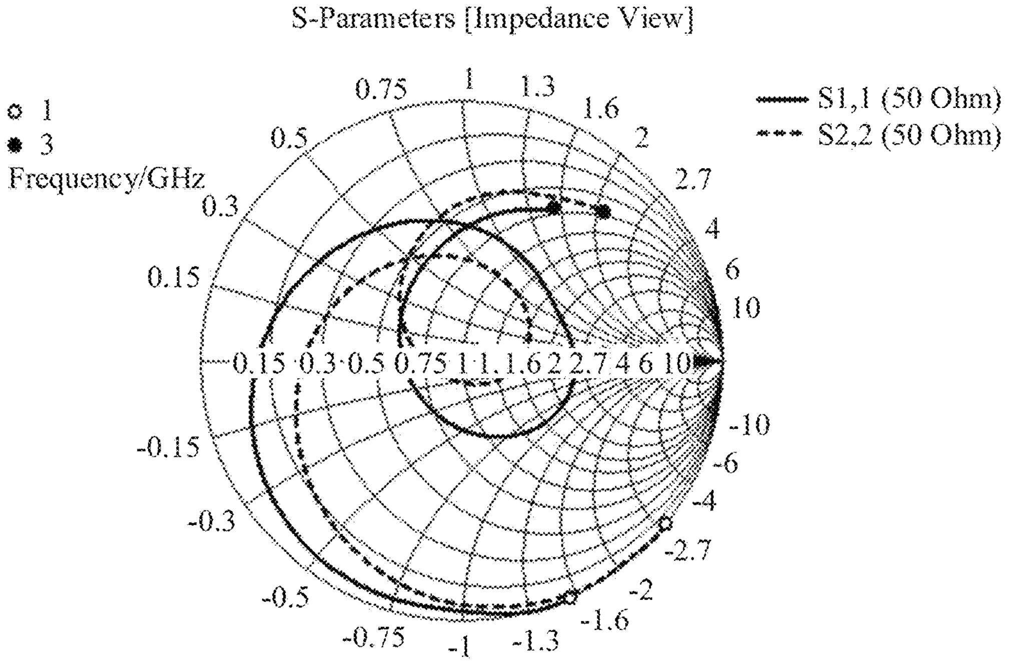
Figure 19:
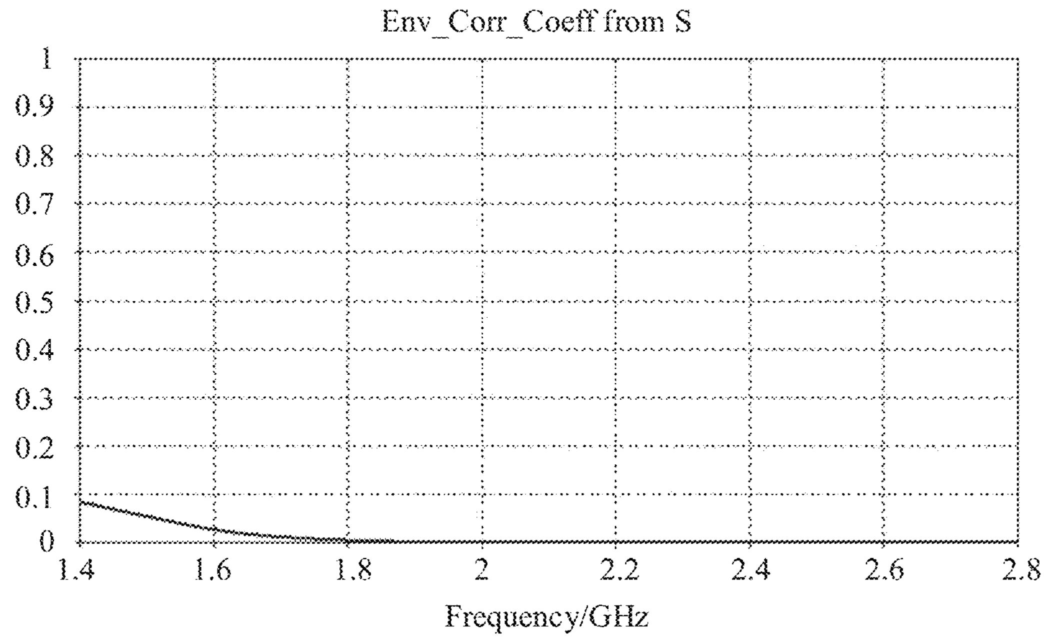
FIG. 19 illustrates the Envelope Correlation Coefficient of the example embodiment of the antenna structure whose S parameter performance is shown in FIGS. 17 and 18.

FIGS. 17 to 19 illustrate the performance of an example embodiment of the antenna structure of FIG. 2. FIGS. 17 and 18 show plots of the S parameters $S_{11}$, $S_{12}$, $S_{21}$ and $S_{22}$ as a function of frequency. $S_{nm}$ is a transmission coefficient which provides a measure of how much of the signal is transmitted to port n from port m. $S_{nn}$ is a reflection coefficient which provides a measure of how much of the signal is reflected back to port n from port n. The antenna structure radiates with the greatest power when $S_{11}$ or $S_{22}$ are low. FIG. 17 shows that the example antenna structure radiates best in the symmetrical mode at 2.45 GHz and 1.8 GHz. These are the two resonant frequencies of that symmetrical mode. FIG. 17 shows that the antenna structure radiates best in the asymmetrical mode at 2.45 GHz. This is one resonant frequency of the asymmetrical mode. The other resonant frequency for the asymmetrical mode is at 1.8 GHz, which can be seen more easily on FIG. 18. FIG. 17 shows that the transmission coefficients $S_{12}$ and $S_{21}$ are the same. This is because the system is reciprocal. Both these (same) plots are low (below −20 dB at the resonant frequencies) which demonstrates high isolation between the symmetrical and asymmetrical modes of the antenna structure. FIG. 19 illustrates the reflected Envelope Correlation Coefficient (ECC) of the symmetrical and asymmetrical modes of the antenna structure. The ECC is low which demonstrates high isolation between the symmetrical and asymmetrical modes of the antenna structure.

Figure 20:
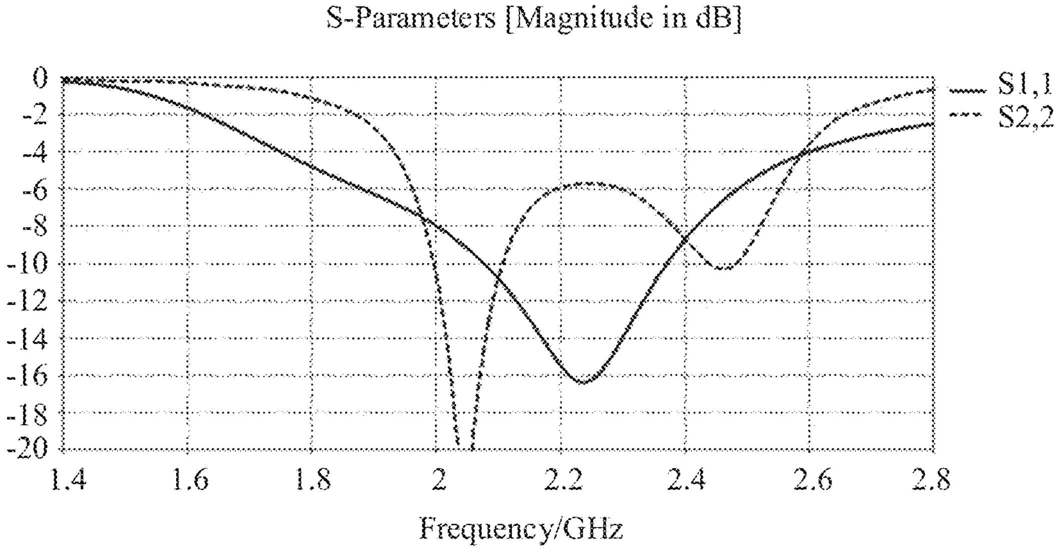
FIGS. 20 and 21 illustrate the S parameter performance for another example embodiment of the antenna structure.
Figure 21:
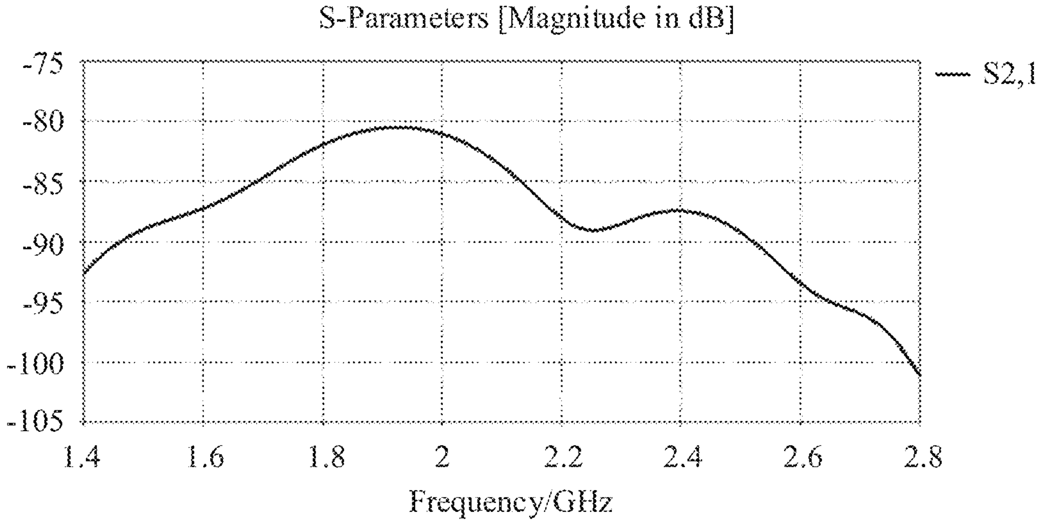

FIGS. 20 and 21 illustrate the performance of the antenna structure of FIG. 2 when the second port has the feedline arrangement shown in FIG. 8, and the first port has the feedline arrangement shown in FIG. 4. FIG. 21 shows extremely high isolation between the symmetrical and asymmetrical modes of the antenna structure, with $S_{12}/S_{21}$ below −80 dB at the resonant frequencies.

Figure 22:
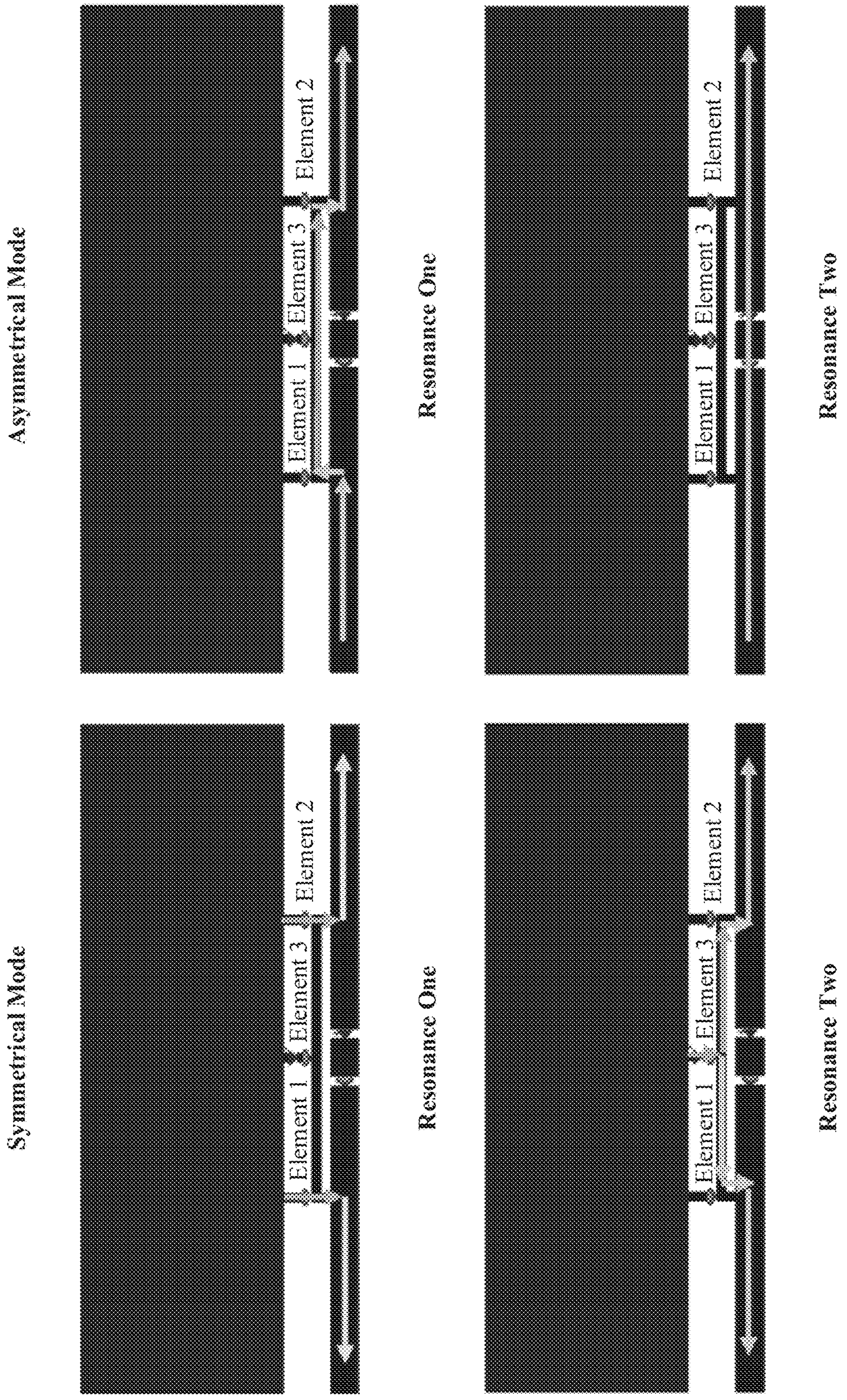
FIG. 22 illustrates the current distributions through the antenna structure of FIG. 2 at the resonant frequencies of the symmetrical and asymmetrical modes.

FIG. 22 illustrates the current distributions through the antenna structure of FIG. 2 at the two resonant frequencies of the symmetrical mode and the two resonant frequencies of the asymmetrical mode during signal transmission. In both modes, resonance two is at a higher frequency than resonance one.

For the symmetrical mode, at the lower resonance frequency of resonance one, the current primarily flows through the outer first port feedlines 209*a*, 209*c*, through the arm connectors 207, and then in opposing directions along the second element 206. At the higher resonance frequency of resonance two, the current primary flows through the central first port feedline 209*b*, along the first element 205 in opposing directions, through the arm connectors 207 and then in opposing directions along the second element 206.

For the asymmetrical mode, at the lower resonance frequency of resonance one, the current primarily flows along the second element 206, and then through one arm connector 207, along the first element 205, through the other arm connector 207, then along the second element 206. At the higher resonance frequency of resonance two, the current primarily flows directly along the second element 206.

The single radiator 201 described herein may be fabricated from metal strips or wire. The ground plane 204 may be fabricated from a large piece of metal, such as copper, on a PCB board.

The feedlines described herein may be fabricated over multiple layers. The single radiator 201 described herein may be fabricated over multiple layers. The antenna structure as a whole may be a planar structure. Alternatively, the antenna structure may have a three-dimensional profile. For example, the single radiator 201 may be a planar structure with the feedlines of one or more of the ports extending out from that planar structure. The single radiator 201 may itself have a three-dimensional profile. This may enable the antenna structure to fit into the shape of the available volume in, for example, the mobile phone or tablet into which the antenna structure is incorporated.

The antenna structure described above uses the same single radiator to transceive in both a symmetrical mode and an asymmetrical mode. The single radiator may simultaneously transceive in the symmetrical mode and the asymmetrical mode. In this scenario, current is flowing in different directions on the same single radiator. Thus, it achieves the two resonances of the prior art described herein but in a more compact structure.

The antenna structure described herein is able to resonate at four resonant frequencies in total rather than the two resonances in the prior art described herein. These four resonances are sufficiently well isolated that signals can be transceived on all four resonant frequencies at the same time.

The four resonant frequencies (two in the symmetrical mode and two in the asymmetrical mode) may all be different. Alternatively, a resonant frequency of the symmetrical mode may be the same as a resonant frequency of the asymmetrical mode. By having a resonant frequency of the symmetrical mode match a resonant frequency of the asymmetrical mode, a signal at that resonant frequency will be able to be transmitted or received with a stronger signal strength.

The resonant frequencies of the symmetrical and asymmetrical modes may fall in the range 1.5 to 3 GHz. For example, a resonant frequency may be 1.8 GHz, which is a frequency for transceiving cellular signals. Another resonant frequency may be 2.1 GHz, which is another frequency for transceiving cellular signals. Another resonant frequency may be 2.45 GHz, which is the frequency for transceiving Bluetooth and WiFi signals. The resonant frequencies of the symmetrical and asymmetrical modes may fall in a wider frequency band. For example, resonant frequencies of up to 24 GHz can be supported by the antenna structure. The dimensions of the elements of the antenna structure described above can be adapted to enable them to resonate in different frequency ranges. For example, the antenna elements can be reduced in length to cause them to have higher resonant frequencies. The antenna elements can be increased in length to cause them to have lower resonant frequencies.

This antenna configuration can be used in a range of devices, such as mobile phones, tablets, base stations, radars or antennas mounted on airplanes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An antenna structure configured to feed a transmitted or received signal via a second port as a differential signal along two feedlines of the second port, the antenna structure comprising:
- a first port;
- the second port; and
- a single radiator connected to both the first and second ports, the single radiator being operable to simultaneously transceive in symmetrical and asymmetrical excited modes,
  - wherein in the symmetrical excited mode, current flows symmetrically through the single radiator to or from the first port, thereby causing the single radiator to resonate at a first resonant frequency,
  - wherein in the asymmetrical excited mode current flows asymmetrically through the single radiator to or from the second port, thereby causing the single radiator to resonate at a second resonant frequency,
  - wherein the single radiator comprises: a first element, which is elongate and linear; a second element, which is elongate, linear, and parallel to the first element; and
- arm connectors connecting the first element to the second element, and
  - wherein the two feedlines of the second port are connected to the second element in a symmetrical arrangement.

2. The antenna structure as claimed in claim 1, wherein the single radiator is operable to transceive in a further symmetrical excited mode in which current flows symmetrically through the single radiator to or from the first port, thereby causing the single radiator to resonate at a third resonant frequency.

3. The antenna structure as claimed in claim 2, wherein the single radiator is operable to simultaneously transceive in both the symmetrical excited mode and the further symmetrical excited mode.

4. The antenna structure as claimed in claim 1, wherein the single radiator is operable to transceive in a further asymmetrical excited mode in which current flows asymmetrically through the single radiator to or from the second port, thereby causing the single radiator to resonate at a fourth resonant frequency.

5. The antenna structure as claimed in claim 4, wherein the single radiator is operable to simultaneously transceive in both the asymmetrical excited mode and the further asymmetrical excited mode.

6. The antenna structure as claimed in claim 1, wherein the first element, second elements and arm connectors form a symmetrical structure.

7. The antenna structure as claimed in claim 1, wherein the first port comprises a set of first port feedlines connected to the first element in a symmetrical arrangement.

8. The antenna structure as claimed in claim 7, configured to feed a signal being transmitted or received via the first port along a central first port feedline of the set of first port feedlines.

9. The antenna structure as claimed in claim 1, configured to feed a signal being transmitted or received via the second port as a differential signal along the two second port feedlines.

10. The antenna structure as claimed in claim 1, configured to feed a signal being transmitted or received via the second port through a co-axial cable coupled to a balun or a microstrip coupled to a balun.

11. The antenna structure as claimed in any of claim 1, wherein each first port feedline each second port feedline comprises impedance matching network circuitry.

12. The antenna structure as claimed in claim 1, further comprising a three-dimensional profile and/or being comprised partially or wholly of multiple layers.

13. A method of operating an antenna structure comprising a first port, a second port, and a single radiator connected to both the first and second ports, the method comprising:
- feeding a transmitted or received signal via the second port as a differential signal along two feedlines,
  - wherein feeding the transmitted or received signal includes simultaneously transceiving in symmetrical and asymmetrical excited modes,
  - wherein in the symmetrical excited mode current flows symmetrically through the single radiator to or from the first port, thereby causing the single radiator to resonate at a first resonant frequency,
  - wherein in the asymmetrical excited mode in which current flows asymmetrically through the single radiator to or from the second port, thereby causing the single radiator to resonate at a second resonant frequency,
  - wherein the single radiator comprises a first element that is elongate and linear, a second element that is elongate, linear and parallel to the first element, and arm connectors connecting the first element to the second element, and
  - wherein the two feedlines of the second port are connected to the second element in a symmetrical arrangement.

14. The method as claimed in claim 13, further comprising: transceiving in a further symmetrical excited mode in which current flows symmetrically through the single radiator to or from the first port, thereby causing the single radiator to resonate at a third resonant frequency.

15. The method as claimed in claim 14, further comprising: simultaneously transceiving in both the symmetrical excited mode and the further symmetrical excited mode.

16. The method as claimed in claim 13, further comprising: transceiving in a further asymmetrical excited mode in which current flows asymmetrically through the single radiator to or from the second port, thereby causing the single radiator to resonate at a fourth resonant frequency.

17. The method as claimed in claim 16, further comprising: simultaneously transceiving in both the asymmetrical excited mode and the further asymmetrical excited mode.

18. A single radiator connected to both of first and second ports of an antenna structure configured to feed a transmitted or received signal via the second port as a differential signal along two feedlines of the second port, wherein the single radiator is configured to simultaneously transceive in symmetrical and asymmetrical excited modes, wherein in the symmetrical excited mode, current flows symmetrically through the single radiator to or from the first port, thereby causing the single radiator to resonate at a first resonant frequency, and wherein in the asymmetrical excited mode asymmetrically through the single radiator to or from the second port, thereby causing the single radiator to resonate at a second resonant frequency;

the single radiator comprises an elongate and linear first element;

the single radiator further comprises an elongate and linear second element that is parallel to the first element; and the single radiator still further comprises arm connectors connecting the first and second elements, wherein the two feedlines of the second port of the antenna structure are connected to the second element in a symmetrical arrangement.

19. The single radiator as claimed in claim 18, wherein the first element, second elements and arm connectors form a symmetrical structure.

20. The single radiator as claimed in claim 18, wherein the first element is connected, in a symmetrical arrangement, to a set of first port feedlines comprising the first port of the antenna structure.

* * * * *